United States Patent Office 3,440,201
Patented Apr. 22, 1969

3,440,201
MELAMINE - FORMALDEHYDE PHOSPHATE ETHER POLYOL RESINS USEFUL FOR COATING COMPOSITIONS, PROCESS FOR THEIR PREPARATION AND COATING COMPOSITIONS CONTAINING SUCH RESINS
Robert E. Sempert, Homewood, and Robert R. Harris, Burnham, Ill., assignors to The Sherwin-Williams Company, Cleveland, Ohio, a corporation of Ohio
No Drawing. Filed Aug. 26, 1965, Ser. No. 482,915
Int. Cl. C08g 9/30, 51/68
U.S. Cl. 260—31.2                                        11 Claims

ABSTRACT OF THE DISCLOSURE

New water insoluble resinous condensation products useful in coating compositions are prepared by reacting 30–70% by weight of a water soluble phosphate ether polyol containing 4–15% by weight phosphorus, having a hydroxyl number of 400–500 and a functionality of 2–5, in an organic solvent, with 70–30% by weight of a water soluble melamine-formaldehyde or a water soluble alkoxy-melamine-formaldehyde.

---

This invention relates to new and improved resins useful in making coating compositions, to a process for producing such resins, and to new and improved coating compositions containing such resins. The invention is especially useful in the preparation of resins which are suitable for making coating compositions that form intumescent, clear coatings on wood and other substrate.

Intumescence is a state of being swollen or inflated. A film or coating that will inteumesce will enlarge or expand with heat. In other words, it will swell or bubble up and assume a cellular structure. Coatings of this type provide protection to the substrate against the rapid spread of flame.

Most organic films or coatings will burn to an ash. An intumescent coating, on the other hand, should leave a cellular residue on the substrate. The cellular residue should be a thermal insulator which protects the substrate against heat and thereby prolongs the period during which the substrate will not be ignited by a flame.

While intumescent coatings are not new as such, it has been difficult heretofore to develop a clear coating composition, that is, a composition which after being applied to a substrate, such as wood, allows the substrate to be seen through a clear or transparent coating.

It is also desirable that the coating be one which is resistant to water, acids and alkalis found in household chemicals. Furthermore, it should be free from checking and other defects which affect its appearance and stability. In addition, the coating should be resistant to changes in temperature and humidity. The coating composition should also be capable of adhering to a substrate and the finished coating should have hardness and mar resistance. Moreover, where the coating composition is applied to wood paneling, the resultant coating should have print resistance equal to a standard wall panel finish and the cured coating should be capable of being rubbed so that a smooth and beautiful wall panel finish can be obtained.

An object of the invention is to provide new and improved water insoluble resins which are capable of being dissolved in various organic solvents and can be prepared in such solvents as coating compositions that, when applied to a conventional substrate, such as wood, and dried thereon, will adhere thereto and at the same time provide an intumescent coating.

Another object of the invention is to provide coating compositions of the type described which form clear coatings that can be cured in a relatively short period of time, retain their clarity, are resistant to moisture, are resistant to all normal household chemicals, have cold check resistance, are mar resistant, and possess impact resistance.

An additional object is to provide coating compositions of the type described which when applied to a substrate are glossy.

A further object of the invention is to provide a new and improved process for producing the resins employed in making the aforesaid coating compositions. Other objects will appear hereinafter.

In accordance with the invention new and improved water insoluble resinous condensation products are produced which are the products of the reaction of a water soluble phosphate ether polyol and a water soluble melamine-formaldehyde or alkoxy methyl-melamine-formaldehyde.

These products are prepared by reacting a water soluble phosphate ether polyol and a water soluble melamine-formaldehyde or alkoxy melamine-formaldehyde in an organic solvent or solvents for the reactants at temperatures sufficiently high to remove or boil off from the reaction mixture the by-products of the reaction, which are either water or an alcohol, depending upon whether melamine-formaldehyde or an alkoxy methyl-melamine-formaldehyde is employed as a starting material. In most cases, the temperature of the reaction should be at least 200° F. (93° C.). In general, satisfactory results are obtained by carrying out the reaction in a temperature range from 210° F. (98.9° C.) to 260° F. (115.5° C.).

The reaction is preferably carried out in the presence of an acidic condensation catalyst. Good results have been obtained by using para-toluene sulfonic acid. Since this is a solid, it is usually preferable to dissolve it in a solvent which is compatible with the resultant product or can be eliminated by heat during the reaction period. A suitable solvent is methanol but other compatible solvents can be used. Other acidic condensation catalysts can also be employed, such as, for example, phosphoric acid. Acidic condensation catalysts containing metals, such as aluminum chloride, can be used to produce water insoluble resins from water soluble phosphate ether polyols and water soluble melamine-formaldehyde or alkoxy melamine-formaldehyde. However, resins made with such catalysts do not intumesce as readily because the metal of the catalyst may interfere with intumescence.

The solvent medium for the water soluble phosphate and the water soluble melamine-formaldehyde or the alkoxy methyl-melamine-formaldehyde is preferably commercial xylene. Other suitable solvents are toluene, methyl ethyl ketone, methyl isobutyl ketone, butyl acetate, ethyl acetate, isopropyl acetate, and the acetate of ethylene glycol monoethylether. The solvents can be used alone or in the form of mixtures with each other. A suitable commercial xylene is "Xylene 5° C." which is a mixture containing 10% to 30% orthoxylene, up to 20% ethyl benzene and the remainder meta and paraxylene. The solvent should be capable of dissolving the water insoluble resinous reaction product so that the end product is a coating composition containing the resin and the solvent.

It will be recognized that water soluble melamine-formaldehyde or alkoxy melamine-formaldehyde has six reactive sites occupied by hydroxy groups or alkoxy groups. In other words, one of the starting materials used in the practice of the invention has a functionality of 6. The phosphate ether polyol can have a functionality from 2 to 5. The extent of the reaction can be determined by the quantity of water or alcohol eliminated during the condensation as compared with the quantity of water or alcohol which can be theoretically eliminated. For the purpose of the invention, the reaction should be carried far enough so that 35% to 80% of the functional groups have reacted.

The resins which are especially useful in forming coating compositions which can be applied to a substrate and cured to produce a clear coating that will intumesce are the water insoluble, xylene soluble products of the reaction of a water soluble phosphate ether polyol containing 4% to 15% by weight of phosphorus, having a hydroxyl number of 400–500, and a functionality of 2–5, and water soluble melamine-formaldehyde or alkoxy melamine-formaldehyde containing 30% to 45% by weight melamine and 40% to 65% by weight formaldehyde, alkoxy groups, if present, constituting the remainder.

The optimum range for varnish compositions is 30% to 70% by weight phosphate ether polyol and 70% to 30% by weight melamine-formaldehyde resin. Intumescent varnish compositions of the invention should preferably contain 1.2% to 10.5% by weight phosphorus, 9% to 31.5% by weight melamine and 12% to 49% by weight formaldehyde, based on the resin weight.

Examples of suitable phosphate ether polyols are those having the following structural formulae:

(1) 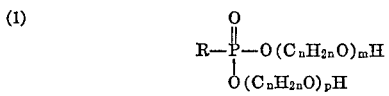

where R is aliphatic hydrocarbon (e.g., methyl, ethyl, propyl, isopropyl, butyl, isobutyl, amyl, isoamyl and higher homologues), $n$ is 2, 3 or 4, and $m$ and $p$ are at least 1, the total of $m$ and $p$ preferably being 2 to 12. The radical R can be phenyl, tolyl, cyclohexyl or the like, and can contain halogen substituents (e.g., chlorine and bromine), or hydroxyl substituents (e.g., hydroxy ethyl, hydroxy propyl, or hydroxy butyl). A typical commercial product in this class is di(polyoxypropylene)butyl phosphate (Fyrol 19) made by reacting butyl phosphate with 1,2-propylene oxide.

Phosphate ether polyols having the Formula 1 can be made by reacting an organic phosphorus acid of the formula (2) 

where R has the previous significance with an alkylene oxide such as ethylene oxide, 1,2-propylene oxide or 1,2-butylene oxide, or mixtures of these oxides, or any two or more of these oxides added sequentially. The addition of ethylene oxide produces adducts containing primary hydroxyl groups which are generally more reactive than secondary hydroxy groups derived from 1,2-propylene oxide. Ethylene oxide addition also increases water solubility. Thus, in order to provide terminal primary hydroxyl groups, 1,2-propylene oxide can be added to the organo phosphorus acid followed by ethylene oxide.

The O,O-dialkyl bis(hydroxyalkyl)amino-methyl phosphonates can also be employed in the practice of the invention. These compounds have the chemical formula (3) 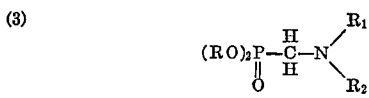

where R is alkyl (e.g., methyl, ethyl, propyl, isopropyl, butyl, and higher homologues) and $R_1$ and $R_2$ are hydroxyalkyl (e.g., 2-hydroxy ethyl, 2-hydroxy propyl, and homologues). A commercially available phosphate ether polyol of this type is O,O-diethyl N,N(2-hydroxyethyl) aminomethyl phosphate which has the Formula 3 wherein R is ethyl and $R_1$ and $R_2$ are hydroxyethyl.

The phosphate ether polyol can also be one which is derived by oxyalkylation of a polyphosphoric acid. Examples of such polyols are those having the formula (4) 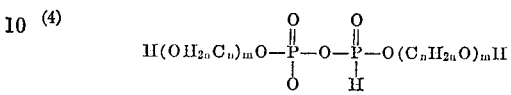

where $n$ is 2 to 4 and $m$ is 1 to 4. A specific compound of this type is made by oxyalkylating the polyphosphoric acid with 4 to 8 moles of 1,2-propylene oxide per mole of acid (Vircol 82).

Other suitable phosphate ether polyols are those derived by oxyalkylating pyrophosphoric acid with ethylene oxide and/or 1,2-propylene or other alkylene oxides. These phosphate ether polyols have the general formula (5) 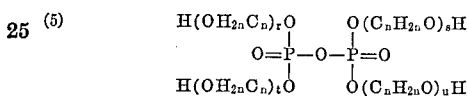

where $n$ is to 2 to 4 and $r$, $s$, $t$ and $u$ are one or more depending upon the number of moles of alkylene oxide used in making the adduct. Thus, in a four mole adduct made by reacting four moles of 1,2-propylene oxide with one mole of pyrophosphoric acid the formula would be the following (6) 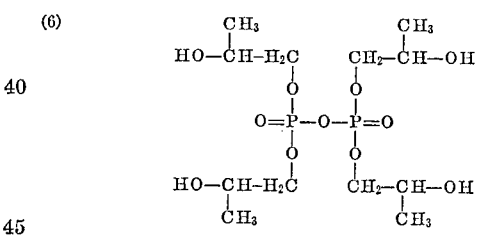

Commercial products containing ether polyols of Formula 6 apparently blended with propylene oxide adducts of pentaerythytol of proper molecular weight to give products containing about 5.5% phosphorus by weight and which are suitable for the practice of the invention are Polyol 204-S, Polyol 216-S and Polyol 227-S.

Melamine-formaldehyde and alkoxylated melamine-formaldehyde cross link with the phosphate ether polyols to form the products of the invention. Melamine has six reactive hydrogens and therefore can be reacted with one to six moles of formaldehyde to produce a methylol melamine having one to six methylol groups. This product is usually made by condensation at an alkaline pH. Thus, six moles of formaldehyde reacts with one mole of melamine to produce hexamethylolmelamine having the formula (7) 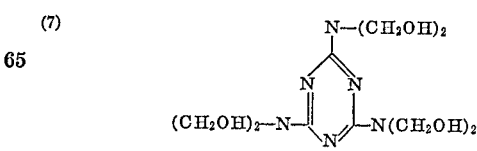

To produce an alkoxy melamine formaldehyde, methylol melamine is reacted with a monohydric alcohol (e.g., methanol, ethanol, propanol, butanol, isobutanol, and higher homologues) at an acid pH. Thus, hexamethylolmelamine reacts with methanol at an acid pH in proportions of one mole per six moles of methanol to form hexamethoxymethyl melamine having the formula (8)

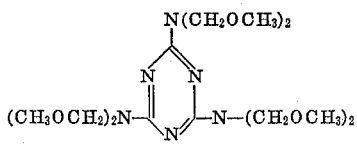

As a practical matter it is preferable to use an alkoxy methyl melamine as one of the reactants and preferably one which is fully alkoxylated. The possibility for side reactions is less and better control can be maintained in carrying out the desired reaction.

In the final products one or more phosphorus atoms are linked through a radical $-O(C_nH_{2n}O)_m-CH_2-$ to one or more nitrogen atoms, where $n$ is 2 to 4 and $m$ represents the number of times the said radical occurs. Where only one mole of methanol has been eliminated in a reaction between hexamethoxymethyl melamine and a phosphate ether polyol of Formula 1 the product would have the formula (9)

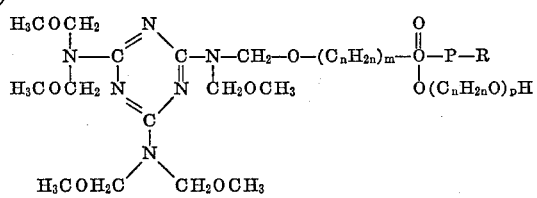

Since the melamine derivative has a functionality of 6 and the phosphate ether polyol has a functionality of at least 2, the final products can be assumed to be mixtures of melamine methylol- or alkoxy methyl-phosphate ether polyol condensation products. The average molecular weight of these products is believed to be in excess of 5000 and usually in the range of 10,000 to 15,000. Due to additional polymerization during curing, a coating of such products polymerizes to higher molecular weights. Excess melamine derivatives will polymerize with itself.

In preparing resins of the type described, it has been noted that the water resistance of coatings made from coating compositions containing such resins increases with an increase in the relative proportion of melamine-formaldehyde or alkoxy melamine-formaldehyde while the degree of intumescence decreases as the ratio of the melamine-formeldehyde or alkoxy melamine-formaldehyde to the phosphate ether polyol increases. The optimum results for the purpose of preparing coating compositions that form clear, water resistant intumescent coatings are obtained by using a molar ratio of the melamine-formeldehyde or alkoxy melamine-formaldehyde to the phosphate ether polyol exceeding 1:1. This ratio, however, preferably should not exceed a molar ratio of 1.6:1.

The invention will be further illustrated but is not limited by the following examples in which the quantities are given by weight unless otherwise indicated.

EXAMPLE I

This example illustrates a preferred procedure for preparing a clear coating varnish containing the resins of the invention. In accordance with this procedure, 420 parts of phosphate ether polyol having a phosphorous content of 5.5%, a hydroxyl number of 450 and a functionality of 4 (Polyol 204-S), is mixed with 290 parts of xylene (Xylene 5° C.) and the mixture is charged into a two liter three-necked flask equipped with agitation, thermometer, condenser and water separation trap. The mixture is heated to 260° F. (115.5° C.)

A second mixture is prepared by mixing together 560 parts of hexamethoxy melamine-formaldehyde (Cymel 300) and 290 parts of xylene.

A third mixture is prepared by mixing 18.8 parts of p-toluene sulfonic acid and 18.8 parts methyl alcohol.

The second and third mixtures are combined. 70 parts of the combined mixture is added over a period of 45 minutes to 1 hour to the first mixture, keeping the temperature at 260° F. while removing all distillate. The temperature is held at 260° F. for 10 to 15 minutes, the heat is turned off and the remainder of the combined second and third mixture is added to the reaction mixture over a period of 1½ to 2 hours, while allowing the temperature to drop to 210° F. After this addition is complete, the temperature is held at 210° F. (98.9° C.) until a viscosity of T-U (Gardner-Holdt) is obtained while continuing to remove all distillate that collects in the separation trap. The product is then cooled to room temperature and is ready for use.

This product has excellent varnish properties and when applied to a wooden wall panel and cured at temperatures of 120° F. and above, gives excellent coatings which have very good intumescence. The thickness of the coating can be varied but is preferably a minimum of 3.5 mils (0.0035″). The coatings cure at about 120° F. in about 8 hours; they cure in ½ hour at 140° F., so that they can be handled, and in ¾ hour at 140° F. to a hard coating. At 225° F. they cure to a hard coating in 5 to 10 minutes.

The resultant coating is water white in color and is color retentive.

In tests that were made on these coatings the hot portion of a Bunsen burner flame did not penetrate beyond the first ply of the wood in 5 minutes. The coatings were moisture resistant and there was no general effect except for slight softening after 18 hours at 90° F. at 100% relative humidity. The cured coatings passed the ASTMD 1211-60 cold check cycle test.

These coatings had exceptional mar resistance and were not dulled when rubbed with glass wool. They also have excellent impact resistance. The gloss was excellent, being 98-100 at 60° on a photovolt gloss meter. The chemical resistance to all normal household chemicals was also excellent.

The thickness of the coating can be varied and two or more coatings can be applied. In the tests described above the thickness was approximately 6-8 mils.

EXAMPLE II

This example is intended to illustrate the effect of varying the proportions of the melamine-formaldehyde resin and the phosphate ether polyol. The example also illustrates the results obtained by varying the extent of the reaction.

The procedure employed was generally similar to that used in Example I except that the proportions of the reactants were varied within a range of 0.94:1 melamine-formaldehyde resin to phosphate ether polyol to 1.57:1 melamine-formaldehyde resin to phosphate ether polyol and the ertent of the reaction was varied based on the percent of hydroxyl reacted from 32% to 63%. The results are shown in the following table.

TABLE I

| Resin No. | A | B | C | D | E | F |
| --- | --- | --- | --- | --- | --- | --- |
| Cymel 300/Polyol 204S | 1.18 | 0.94 | 1.05 | 1.05 | 1.48 | 1.57 |
| Percent OH reacted | 32 | 35 | 50 | 57 | 59 | 63 |
| Cure | Slow | Good | Good | Good | Good | [1] |
| Moisture resistance | Poor | Poor | Improved | Improved | Improved | Good |
| Intumescence | Excell. | Excell. | Excell. | Excell. | Excell. | Excell. |

[1] Almost air dry.

It will be seen from the foregoing table that the weight ratio of the hexamethoxy - melamine - formaldehpde (Cymel 300 or Cymel 301) to phosphate ether polyol (Polyol 204S) has been varied from about 0.9 to about 1.6 and the extent of the reaction has also been increased. In all cases, when the composition was applied to a wood panel and cured, the intumescence of the resultant coating was excellent. The rate of curing improved with an increase in the extent of reaction and also with an increase in the amount of the melamine-formaldehyde resin. In a like manner the moisture resistance improved.

EXAMPLE III

In an apparatus equipped with means for removing a distillate, 900 parts of phosphate ether polyol (Polyol 204S) was heated to 250° F.

1200 parts of hexamethoxymethyl melamine was mixed with 796 parts of xylene, 42 parts of p-tolene sulfonic acid and 42 parts of methanol. Another mixture was prepared from 415 parts of methyl isobutyl ketone and 100 parts of mineral spirits. 173 parts of the mixture containing the hexamethoxymethyl melamine was added to the phosphate ether polyol at 250° F. in ½ hour and the distillate was collected for 15 minutes thereafter, while the heat was allowed to drop to 210° F. The remainder of the mixture was then added in 1 hour. Thereafter, the mixture of methylisobutyl ketone and mineral spirits was added and the resultant mixture was held at 210° F. to U viscosity (Gardner-Holdt). The resultant product is an excellent varnish coating composition. In preparing this product additional solvents can also be used, for example, 17 parts of methanol and 17 parts of di-tertiary acetylenic glycol. The latter is added to improve the flow and appearance of the dry coating. It does not add or take away from the intrumescence.

It will be understood that other resins coming within the scope of the invention can be prepared according to the general procedure described by employing other melamine-formaldehyde or alkoxy - melamine - formaldehyde condensation products and other phosphate ether polyols of the type previously described. The quantity of catalyst employed will vary but usually does not exceed 3.5%. If no catalyst is used, the curing temperature of the resultant resins is around 290° F. whereas with a catalyst, such as p-toluene sulfonic acid, the curing temperature can be reduced to 140° F. It is also possible to prepare resins which will air cure at ambient temperatures by using hydrochloric acid in methanol as a catalyst.

The proportion of solvent in the varnish compositions is subject to variation but is preferably within the range of 40–60% by weight. When the amount of solvent is under 30%, the composition becomes too viscous for conventional application and when it is over 60% it becomes too thin so that many coatings would be required in order to produce a final coating of the desired thickness. It is usually preferable to employ a solvent or combination of solvents in such proportions that the composition after being applied as a coating will set to touch in 30 minutes. The solvents used, such as xylene and the other solvents mentioned, all have a vapor pressure at ambient temperatures such that they will evaporate readily.

Resins of the type herein described can be used in paper coating. They can also be cast into films or sheets and they are useful for other purposes. The invention is especially important, however, in providing resins and compositions containing such resins which can be applied as clear coatings that are intumescent and have most, if not all of the other desirable properties of a satisfatcory coating. Wooden panels which have been given a clear finish with coatings of these resins will cure at reasonable temperatures within the range of 140–225° F. and for periods within the range from 5 to 30 minutes. The resultant intumescent coatings on a wall panel will slow the spread of flame and thus make it possible to allow evacuation of a building and save the lives within the building in case of fire.

The invention is hereby claimed as follows:

1. Water insoluble resinous condensation products of the reaction in an organic solvent of 30–70% by weight of a water soluble phosphate ether polyol containing 4–15% by weight phosphorus, having a hydroxyl number of 400–500 and a functionality 2 to 5, and 70–30% by weight of a compound from the group consisting of a water soluble melamineformaldehyde and a water soluble alkoxy melamine-formaldehyde.

2. A resin as claimed in claim 1 in which the molar ratio of said melamine compound to said phosphate ether polyol is greater than 1:1 and not more than 1.6:1.

3. A resin as claimed in claim 1 in which said phosphate ether polyol is an oxyalkylated phosphorus acid containing 2 to 4 carbon atoms in the oxyalkyl groups.

4. A resinous condensation product as claimed in claim 1 which contains 1.2% to 10.5% by weight phosphorus, 9% to 31.5% by weight melamine and 12% to 49% by weight formaldehyde.

5. A water insoluble condensation product of the reaction in an organic solvent of 30–70% by weight of a water soluble oxypropylated pyrophosphoric acid containing approximately 5.5% by weight phosphorus, having a hydroxyl number of approximately 450 and a functionality of 4, and 70–30% by weight of hexamethoxy melamine-formaldehyde condensed to the extent that 35–80% of the functional groups have reacted.

6. A process for preparing resins which comprises heating a mixture of 30–70% by weight of a water soluble phosphate ether polyol containing 4–15% by weight phosphorus, having a hydroxyl number of 400–500, and a functionality of 2 to 5, with 70–30% by weight of a melamine compound from the group consisting of a water soluble melamine-formaldehyde and a water soluble alkoxy melamine-formaldehyde in an organic solvent at a temperature of at least 200° F., and removing byproducts from the group consisting of water and monohydric alcohols which are vaporized during the process.

7. A process as claimed in claim 6 in which said mixture contains an acidic condensation catalyst.

8. A process as claimed in claim 7 in which said acidic condensation catalyst is p-toluene sulfonic acid.

9. A process as claimed in claim 6 in which said solvent is from the group consisting of toluene, xylene, methyl ethyl ketone, methyl isobutyl ketone, ethyl acetate, isopropyl acetate, butyl acetate, and the acetate of ethylene glycol monoethylether.

10. A coating composition which is intumescent and which comprises a water insoluble resinous condensation product of the reaction of 30–70% by weight of a water soluble phosphate ether polyol containing 4–15% by weight phosphorus, having a hydroxyl number of 400–500 and a functionality of 2 to 5, and 70–30% by weight of a compound from the group consisting of a water soluble melamine-formaldehyde and a water soluble alkoxy melamine-formaldehyde, said resinous condensation product containing 1.2% to 10.5% by weight phosphorus, 9% to 31.5% by weight melamine and 12% to 49% by weight formaldehyde, said condensation product being dissolved in an organic solvent which will evaporate when a coating of said composition is applied to an object, and said composition also containing an acidic curing catalyst.

11. A wooden panel coated with an intumescent, clear, water resistant, cured coating of a coating composition as claimed in claim 10.

References Cited

UNITED STATES PATENTS

| | | | |
|---|---|---|---|
| 3,008,926 | 11/1961 | Reuter et al. | 260—67.6 |
| 2,830,964 | 4/1958 | Bullock et al. | 260—29.4 |
| 2,812,311 | 11/1957 | Reeves et al. | 260—2 |

(Other references on following page)

UNITED STATES PATENTS

| | | | |
|---|---|---|---|
| 3,317,510 | 5/1967 | Birum | 260—210 |
| 3,099,676 | 7/1963 | Canham | 260—461 |

OTHER REFERENCES

Fireproofing of Polymers, SPE Transactions, January 1964, Boyer et al., pages 45–47 and 54.

Chem. Abstracts, vol. 52, 4202i–4203a, Schulenburg, 1958.

Chem. Abstracts, vol. 58, 3562g–h 3563a, Union Carbide, 1963.

WILLIAM H. SHORT, *Primary Examiner.*

HOWARD SCHAIN, *Assistant Examiner.*

U.S. Cl. X.R.

260—31.6, 32.8, 33.2, 33.6, 33.4, 67.6; 117—136, 148, 161

UNITED STATES PATENT OFFICE

CERTIFICATE OF CORRECTION

Patent No. 3,440,201　　　　　　　　　　Dated April 22, 1969

Inventor(s) Robert E. Sempert et al

It is certified that error appears in the above-identified patent and that said Letters Patent are hereby corrected as shown below:

Column 4, Formula 4, that portion of the formula reading
$$\begin{array}{c}\text{"P"}\\|\\\text{O}\end{array}$$
should read
$$\begin{array}{c}\text{"P"}\\|\\\text{H}\end{array}.$$

Column 5, formula 9, that portion of the formula reading
$$\begin{array}{c}\text{O}\\\|\\\text{O-P}\\|\\\text{O}\end{array}\text{"}$$
should read
$$\text{"}\begin{array}{c}\text{O}\\\|\\\text{O-P}\\|\\\text{O}\end{array}\text{"}.$$

SIGNED AND
SEALED
JUN 3 0 1970

(SEAL)
Attest:

Edward M. Fletcher, Jr.
Attesting Officer

WILLIAM E. SCHUYLER, JR.
Commissioner of Patents